(12) United States Patent
Hyoudou et al.

(10) Patent No.: US 8,719,390 B2
(45) Date of Patent: May 6, 2014

(54) SERVER MANAGEMENT APPARATUS AND SERVER MANAGEMENT METHOD

(75) Inventors: Kazuki Hyoudou, Kawasaki (JP); Takeshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 13/170,922

(22) Filed: Jun. 28, 2011

(65) Prior Publication Data

US 2012/0011236 A1  Jan. 12, 2012

(30) Foreign Application Priority Data

Jul. 6, 2010  (JP) .................................. 2010-153721

(51) Int. Cl.
*G06F 15/177* (2006.01)
*G06F 15/173* (2006.01)

(52) U.S. Cl.
USPC .......................................... 709/222; 709/223

(58) Field of Classification Search
USPC ............ 709/220–226; 713/1–2; 717/168–178
See application file for complete search history.

(56) References Cited

U.S. PATENT DOCUMENTS

| 6,421,777 B1 * | 7/2002 | Pierre-Louis et al. ............. 713/2 |
| 6,535,976 B1 * | 3/2003 | Hoggarth et al. .................. 713/2 |
| 6,601,096 B1 * | 7/2003 | Lassiter, Jr. ..................... 709/222 |
| 7,225,327 B1 * | 5/2007 | Rasmussen et al. ............... 713/2 |
| 2001/0044934 A1 | 11/2001 | Hirai et al. |
| 2003/0145061 A1 | 7/2003 | Kochiya |
| 2005/0097360 A1 * | 5/2005 | Chu et al. ....................... 713/201 |
| 2005/0193189 A1 * | 9/2005 | Kim ................................... 713/1 |
| 2007/0073875 A1 * | 3/2007 | Goto et al. ...................... 709/224 |
| 2009/0049161 A1 * | 2/2009 | Takeuchi et al. ............... 709/222 |
| 2012/0005472 A1 * | 1/2012 | Nagai ................................ 713/2 |
| 2012/0221842 A1 * | 8/2012 | Gopalakrishnan et al. ....... 713/2 |

FOREIGN PATENT DOCUMENTS

| JP | 2002-041298 |   | 2/2002 |
| JP | 2003-216593 | A | 7/2003 |
| JP | 2006-252117 |   | 9/2006 |
| JP | 2007-183837 | A | 7/2007 |
| JP | 2008-217225 | A | 9/2008 |

OTHER PUBLICATIONS

Japanese Office Action mailed Dec. 3, 2013 for corresponding Japanese Application No. 2010-153721, with partial Englis-language translation.

* cited by examiner

*Primary Examiner* — Brendan Higa
(74) *Attorney, Agent, or Firm* — Fujitsu Patent Center

(57) ABSTRACT

A computer is communicable with a managed server having a network boot function. The computer refers, when the managed server starts network boot, to data stored in a storage unit which stores status management data and status-program connection data. The status management data specifies an operation status into which the managed server is to be shifted when the managed server has been network booted. The status-program connection data indicates a program for shifting the managed server into the specified operation status. The computer determines, on the basis of the status management data and the status-program connection data, a program to be executed during the network boot to shift the managed server into the specified operation status. The computer notifies the managed server of information necessary for loading the determined program.

8 Claims, 10 Drawing Sheets

| SERVER ID | IP ADDRESS | OPERATION STATUS |
|---|---|---|
| 00:00:10:00:00:01 | 192.168.10.101 | ORDINARY OPERATION |
| 00:00:10:00:00:02 | 192.168.10.102 | ENVIRONMENT SETUP |
| 00:00:1c:00:01:01 | 192.168.10.122 | REMOTE MAINTENANCE |
| 00:00:1d:00:00:10 | 192.168.10.200 | INITIAL INSTALLATION |

FIG. 2

| OPERATION STATUS | PROGRAM |
|---|---|
| ORDINARY OPERATION | OS LOADER |
| ENVIRONMENT SETUP | ENVIRONMENT SETUP PROGRAM |
| REMOTE MAINTENANCE | iSCSItarget |
| INITIAL INSTALLATION | INSTALLATION PROGRAM |

FIG. 3

SERVER MANAGEMENT APPARATUS AND SERVER MANAGEMENT METHOD

CROSS-REFERENCE TO RELATED APPLICATION

This application is based upon and claims the benefit of priority of the prior Japanese Patent Application No. 2010-153721, filed on Jul. 6, 2010, the entire contents of which are incorporated herein by reference.

FIELD

The embodiments discussed herein are related to a technique to manage a server connected to a network.

BACKGROUND

Techniques have been proposed for various setups on a managed server connected to a network by using a network boot function that the managed server has. According to one of them, e.g., a management server communicable with the managed server stores therein pieces of position information such as an Internet protocol (IP) address, a connection port number, etc. of the managed server in connection with setup information of the managed server. Upon the managed server being replaced, the management server automatically performs an environment setup during a network boot of a new managed server after the replacement on the basis of setup information corresponding to the position information of the new managed server. Further, in a system of a cold standby configuration, another technique is known to load a standby blade during a network boot with an operating system (OS) for maintenance from a management server so as to make the standby blade ready for maintenance. Still further, a technique has been proposed in which a management server holds pieces of information for setting a managed server up and loads the managed server with various pieces of setup information during a network boot of the managed server so as to save a storage device that the managed server has.

Related techniques are disclosed in, e.g., Japanese Laid-open Patent Publications No. 2007-183837, 2008-217225 and 2003-216593.

SUMMARY

According to an aspect of the present invention, provided is a server management method executed by a computer communicable with a managed server having a network boot function. The computer refers, when the managed server starts network boot, to data stored in a storage unit which stores status management data and status-program connection data. The status management data specifies an operation status into which the managed server is to be shifted when the managed server has been network booted. The status-program connection data indicates a program for shifting the managed server into the specified operation status. The computer determines, on the basis of the status management data and the status-program connection data, a program to be executed during the network boot to shift the managed server into the specified operation status. The computer notifies the managed server of information necessary for loading the determined program.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 2 is a diagram illustrating an exemplary data structure of a status management table according to an embodiment of the present invention;

FIG. 3 is a diagram illustrating an exemplary data structure of a status-program connection table according to an embodiment of the present invention;

DESCRIPTION OF EMBODIMENTS

The managed server does not necessarily work in the same system conditions. Thus, it is preferable to shift the managed server into an operation status matching the system conditions during a network boot of the managed server.

According to the conventional techniques, however, the managed server may merely load, during a network boot, a piece of information set in a fixed manner. Thus, a control operation which puts the managed server into an operation status matching the system conditions by means of a network boot may not be implemented.

Thus, it is preferable to enable a managed server to be put into an operation status matching system conditions by means of a network boot of the managed server.

According to the embodiments, a managed server may be put into an operation status matching system conditions by means of a network boot of the managed server.

First Embodiment

Figure 1:
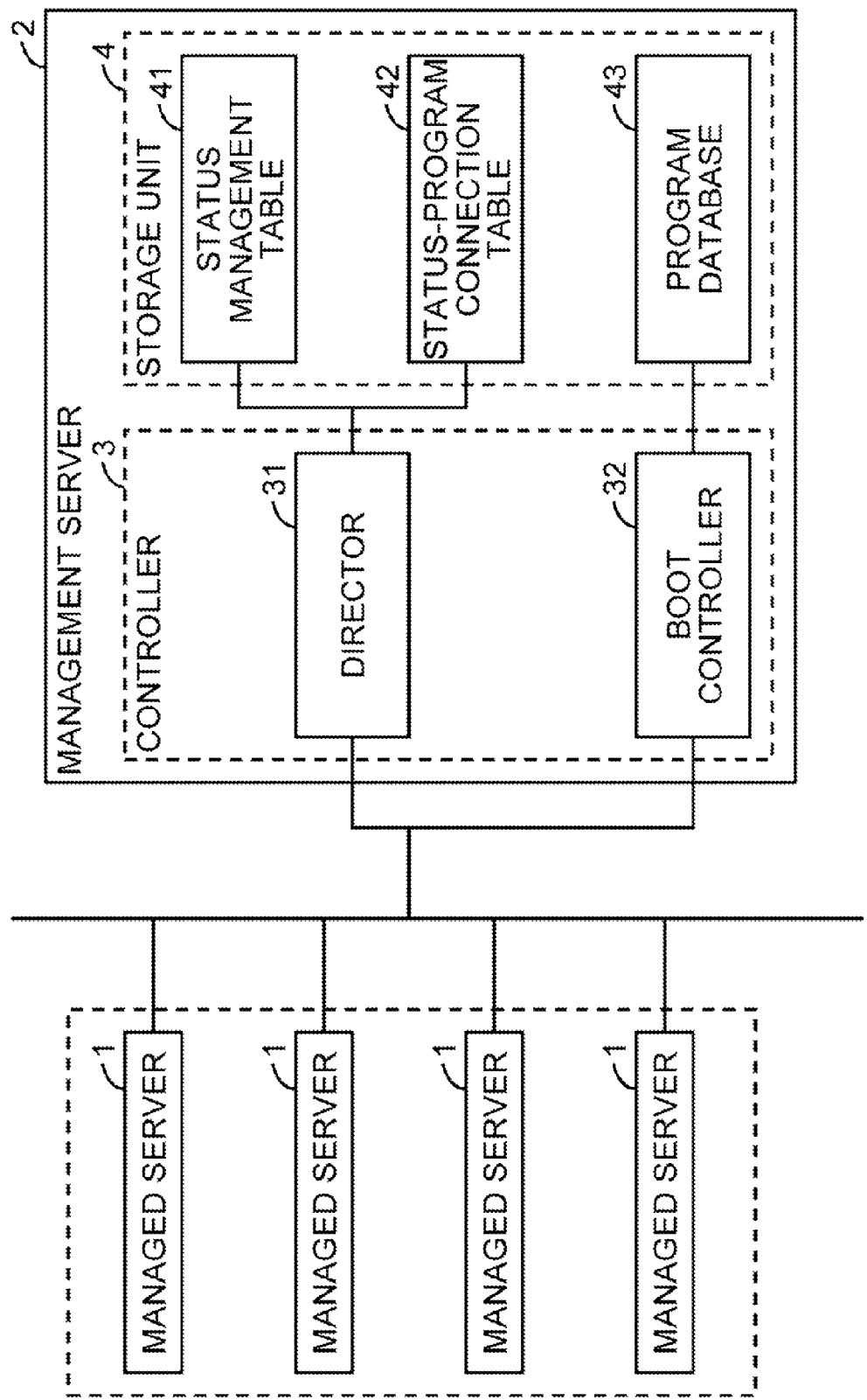
FIG. 1 is a diagram illustrating an exemplary entire configuration of a server management system according to an embodiment of the present invention.

FIG. 1 illustrates an exemplary entire configuration of a server management system according to a first embodiment.

The server management system has one or more managed servers 1 and a management server 2 which manages operation statuses of the respective managed servers 1 and holds programs that the respective managed servers 1 load during a network boot. The managed servers 1 and the management server 2 are connected through a network so as to communicate with each other. The network is, e.g., a local area network (LAN), etc., either wired or wireless.

Each managed server 1 is a computer having a network interface card (NIC) provided with a network boot function. A basic input/output system (BIOS), etc. for the computer is preset to enable the computer to start working by a network boot.

The management server 2 has a controller 3 which is a mechanism for carrying out various processes, and a storage unit 4 which is a storage means for storing therein data and programs necessary for processes to be carried out by the controller 3.

The controller 3 has a director 31 and a boot controller 32. The director 31 works as a dynamic host configuration protocol (DHCP) server which assigns an IP address to the managed server 1 when the managed server 1 is network booted. Further, the director 31 determines a program that the managed server 1 loads during a network boot, and notifies the managed server 1 of a piece of information necessary for the managed server 1 to load the determined program. The boot controller 32, upon being requested by the managed server 1, works as a preboot execution environment (PXE) server which provides a boot program necessary for a network boot of a managed server 1.

The storage unit 4 has a status management table 41 for managing an operation status of the managed server 1 and a status-program connection table 42 on which the operation status of the managed server 1 is connected to a program which puts the managed server 1 into that operation status. Further, the storage unit 4 has a program database 43 in which programs that the managed servers 1 load during a network boot are stored.

FIG. 2 illustrates an exemplary data structure of the status management table 41 according to the present embodiment. On the status management table 41, as illustrated in FIG. 2, a server identifier (ID) for identifying the managed server 1, an IP address assigned to the managed server 1 and a piece of information indicating an operation status that the managed server 1 should be shifted into through a network boot are set in connection with one another. The server ID is an identifier capable of physically uniquely identifying the managed server 1, and is, e.g., a media access control (MAC) address, etc. An operation status that the managed server 1 should be shifted into through a network boot is, e.g., a state of ordinarily operating ("ordinary operation"), a state for carrying out environment setup ("environment setup"), a state for carrying out remote maintenance ("remote maintenance") or a state for carrying out initial installation ("initial installation"). In other words, the status management table 41 is an extension of a table, held by a conventional DHCP server, storing IP addresses of the managed servers 1, augmented with that pieces of information of server IDs and operation statuses of the managed servers 1.

FIG. 3 illustrates an exemplary data structure of the status-program connection table 42 according to the present embodiment. On the status-program connection table 42, as illustrated in FIG. 3, pieces of information respectively indicating an operation status of the managed server 1 and a program which puts the managed server 1 into that operation status are stored in connection with each other. Either a piece of information indicating a particular program or a piece of information indicating a kind of a program (e.g., a program to enable remote maintenance) may be connected. If a piece of information indicating a kind of a program is stored, the managed server 1 is supposed to load one of programs which belong to that kind.

The program database 43 stores therein main bodies of programs that managed servers 1 load during a network boot.

A process carried out by the managed server 1 and the management server 2 will be discussed.

Figure 4:
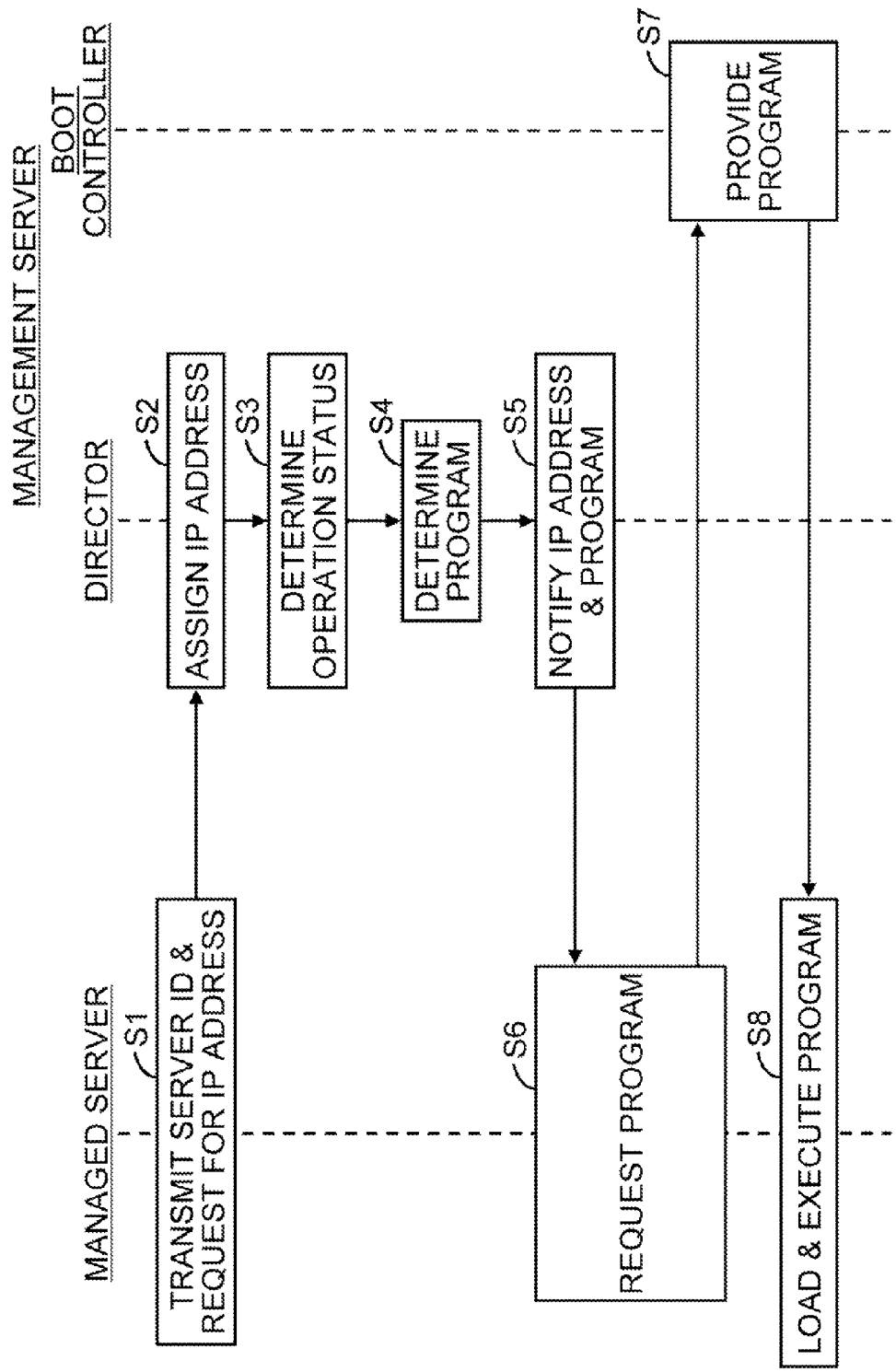
FIG. 4 is a diagram illustrating an exemplary time sequence of a process carried out by a managed server and a management server according to an embodiment of the present invention.

FIG. 4 illustrates an exemplary time sequence of a process carried out by the managed server 1 and the management server 2 when the managed server 1 starts a network boot.

In S1, the managed server 1 transmits a request for assigning an IP address thereto to the management server 2 by means of the network boot function. In this event, the managed server 1 transmits the server ID of its own as well to the management server 2.

In S2, the director 31 of the management server 2 assigns an IP address to the managed server 1 in response to the request for assigning an IP address received from the managed server 1. Then, the director 31 sets the assigned IP address to one of entries on the status management table 41 whose server ID agrees with the server ID of the managed server 1 (i.e., an entry corresponding to the server ID of the managed server 1).

In S3, the director 31 of the management server 2 refers to the status management table 41, and determines an operation status set to the one of the entries on the status management table 41 corresponding to the server ID of the managed server 1 as an operation status that the managed server 1 should be shifted into through the network boot.

In S4, the director 31 of the management server 2 refers to the status-program connection table 42, and determines a program indicated by a piece of information stored in one of entries on the status-program connection table 42 whose operation status agrees with the operation status determined in S3 (i.e., an entry corresponding to the operation status that the managed server 1 should be shifted into through the network boot) as a program that the managed server 1 loads during the network boot.

In S5, the director 31 of the management server 2 notifies the managed server 1 of, as information to be used for the network boot, pieces of information that the managed server 1 is in need of so as to load the program determined above. What is notified of above is, e.g., the IP address of the managed server 1 and a piece of information capable of identifying the program determined above.

In S6, on the basis of the received notification, the managed server 1 notifies the boot controller 32 of its own IP address and requests the program necessary for the network boot. In other words, the managed server 1 accesses the boot controller 32 to load the program necessary for the network boot of its own.

In S7, the boot controller 32 of the management server 2 provides the managed server 1 with the requested program stored in the program database 43. In other words, the boot controller 32 puts the above program stored in the program database 43 into a status in which the managed server 1 may load the program.

In S8, the managed server 1 loads the above program through the boot controller 32 of the management server 2, and executes the program.

Figure 5:
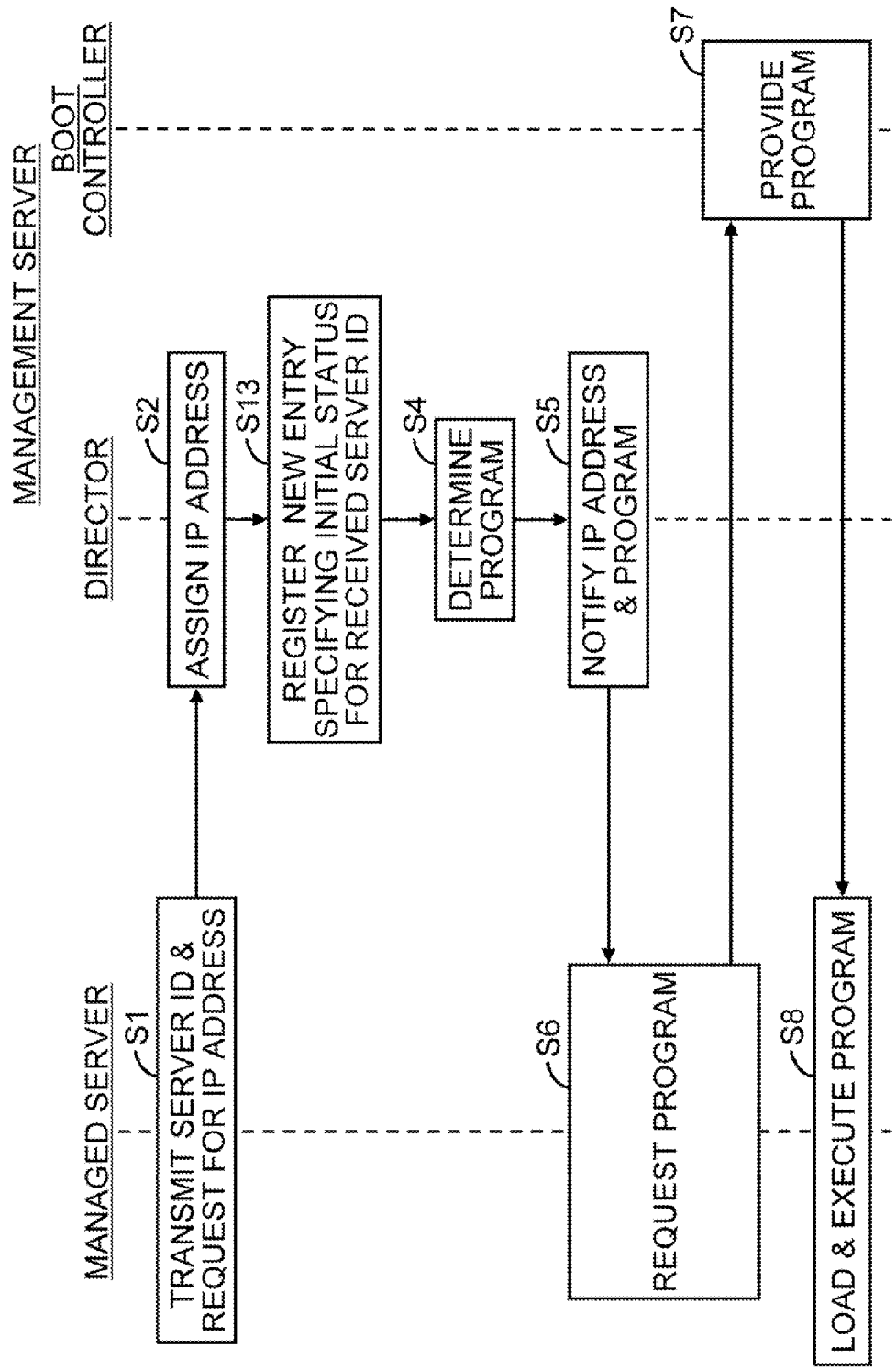
FIG. 5 is a diagram illustrating an exemplary time sequence of a process carried out by a managed server and a management server according to an embodiment of the present invention.

FIG. 5 illustrates an exemplary time sequence of a process carried out by the managed server 1 and the management server 2 when the managed server 1 starts a network boot in a status in which an entry corresponding to the managed server 1 is not registered on the status management table 41 yet.

In FIG. 5, S13 is carried out instead of S3 in FIG. 4. Discussion of the S1 to S2 and S4 to S8 will be omitted.

In S13, since no entry corresponding to the server ID of the managed server 1 sending the request for assigning an IP address is on the status management table 41 at this moment, the director 31 of the management server 2 registers a new entry corresponding to the server ID of the managed server 1. Then, the director 31 stores the assigned IP address in that entry. Further, the director 31 specifies, as the operation status of the managed server 1, a particular initial operation status, e.g., "initial installation", defined in advance.

According to the process of the server management system discussed above, the managed server 1 loads and executes a program corresponding to an operation status the managed server 1 should be shifted into through a network boot of the managed server 1, the operation status being set on the status management table 41 of the management server 2. As a result, the managed server 1 is put into the operation status set on the status management table 41. In other words, by setting an operation status suitable for the system condition on the status management table 41, the managed server 1 may be automatically put into the set status through the network boot.

Since the operation status of the managed server 1 may be controlled by using the network boot function of the managed server 1, a following effect is produced. That is, a related entry on the status management table stored in the storage unit may be replaced with a new entry specifying a new operation status corresponding to an abnormality when the management server 2 detects the abnormality in the managed server 1. For example, a phase at which the network boot is done is a phase before the OS is executed. Thus, even in a case where a hardware failure disabling execution of the OS occurs on the managed server 1 or the OS is not installed yet on the managed server 1 at the time of initial installation, the operation status of the managed server 1 may be changed over in accordance with the system conditions. Conventionally, In such a case, maintenance management is ordinarily done by a server in charge of maintenance of a managed server by using a base management controller (BMC) which monitors hardware conditions of the managed server 1 or manages power supply to the managed server 1, a module for management use only (e.g., an management board (MMB)) which entirely manages, in coordination with the BMC, a plurality of managed servers on a housing-by-housing basis, etc. In lots of cases, as being provided for management use only, such a system configuration supposes lower communication speed of a NIC or a communication line than a system for operations. It is thereby difficult to carry out a process to deal with lots of data (e.g., data recovery or backup in a local disk of the managed server 1, OS installation, etc.). Thus, what may be implemented and managed by means of such a conventional system configuration is limited. According to the server management system discussed above, meanwhile, even in a case where a hardware failure disabling execution of the OS occurs on the managed server 1, the operation status of the managed server 1 may be changed over at the time of a network boot so that a remote operation of data in the managed server 1 may be implemented or the managed server 1 may be put into a status where OS installation is available, as discussed above. In addition, the server management system may implement such a function in a system configuration framework for operations, and need not further add a new hardware component, etc. The server management system may thereby carry out a control by using a high speed network for operations.

Although not being illustrated in FIG. 1, the server management system may use, in parallel, maintenance management by using a BMC or a module for management use only, similarly as the conventional system discussed above. The server management system may further implement, in addition to such a conventional management configuration, various kinds of maintenance management (control) which may not be implemented by means of the conventional configuration only.

When no entry is on the status management table 41 for the server ID of the managed server 1 in the process carried out by the director 31 discussed above, it is supposed that the operation status is the initial installation, and the managed server 1 is loaded with a program to put the managed server 1 into an initial installation state and the program is executed. Thus, as well in a case where a new managed server 1 is connected to the network, etc., a process necessary for initial installation of the managed server 1 may be carried out with a network boot as a trigger. Since an entry corresponding to the managed server 1 is automatically registered at this time, it is unnecessary to manually register an entry on the status management table every time the managed server 1 is installed.

When it is necessary to change over the operation status of the managed server 1, it is enough to change the operation status set to the entry on the status management table 41 so that the operation status of the managed server 1 will be changed over to the status set on the status management table 41 through a network boot next time.

The status management table 41 holds individual operation statuses of the plural managed servers 1. Then, the director 31 may determine the operation statuses of the plural managed servers 1 individually by referring to the status management table 41. Thus, even when the number of the managed servers 1 increases, each managed server 1 may load a proper program without an increase in overhead necessary for management.

The status management table 41 of the server management system holds an operation status, into which the managed server 1 is shifted, in connection with a server ID of the managed server 1. Since the operation status is connected with the server ID, not with an IP address which is dynamically assigned every time the managed server 1 performs a network boot, the operation status corresponding to the managed server 1 may be unfailingly managed even when the network boot of the managed server 1 is performed.

Various specific exemplary operation statuses that a managed server 1 is shifted into will be discussed as to the above process.

Figure 6:
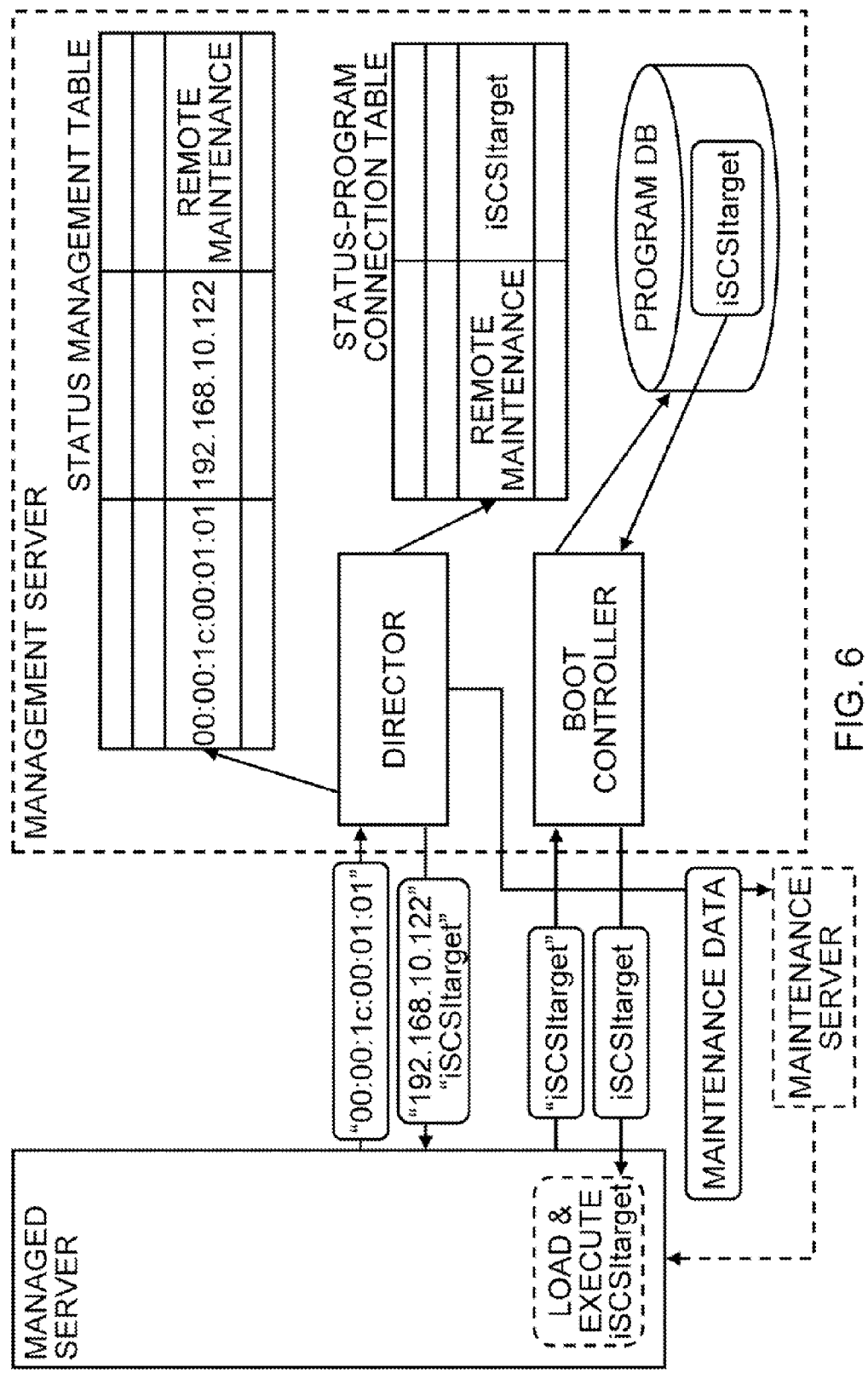
FIG. 6 is a diagram illustrating an exemplary process, for a specific case, carried out by a managed server and a management server according to an embodiment of the present invention.

In a first specific example, such a case will be discussed that an operation status of the managed server 1 is put into a status where remote maintenance of a local disk is enabled. FIG. 6 illustrates a process carried out by the managed server 1 and the management server 2, and data transmitted and received in this specific example. In this specific example, it is supposed that a MAC address of the managed server 1 is "00:00:1c:00:01:01".

The managed server 1 transmits its own MAC address "00:00:1c:00:01:01" to the management server 2 as the server ID. At this time, the director 31 assigns an IP address "192.168.10.122" to the managed server 1 and sets the IP address to one of entries registered on the status management table 41, which corresponds to the MAC address "00:00:1c:00:01:01". Since the operation status of the entry corresponding to the MAC address "00:00:1c:00:01:01" on the status management table 41 is "remote maintenance", the director 31 determines an operation status "remote maintenance" as the operation status that the managed server 1 is shifted into through a network boot. Then, the director 31 determines the iSCSItarget specified in an entry corresponding to the operation status "remote maintenance" from entries on the status-program connection table 42 as a program that the managed server 1 loads. The director 31 notifies the managed server 1 of pieces of information indicating the assigned IP address and the determined program. The iSCSItarget is a program to make a local storage device of a server open to another server as a network storage device and accessible from another server.

The managed server 1 accesses the boot controller 32 of the management server 2 to load the iSCSItarget. The boot controller 32 of the management server 2 provides the managed server 1 with the iSCSItarget stored in the program database 43. The managed server 1 loads and executes the iSCSItarget. As a result, since a local storage of the managed server 1 is made accessible from other servers, e.g., a remote maintenance operation such as a recovery or a backup of a hard disk of the managed server 1, etc. may be done from a maintenance server, etc. connected to the network. The maintenance server, etc. is notified of a piece of information (e.g., the IP address, etc.) necessary for maintenance of the managed server 1, and a remote maintenance operation of the managed server 1 is thereby made available.

According to the above specific example, although the managed server 1 is made execute the iSCSItarget as a program corresponding to a case where the operation status of the managed server 1 is "remote maintenance", the managed server 1 may be made execute another program for remote maintenance depending upon setups on the status-program connection table 42. On the status-program connection table 42, e.g., a program which enables a remote setup of firmware of the managed server 1 or a program which enables a remote automatic update of an application of the managed server 1 may be set as a program in an entry corresponding to the operation status of "remote maintenance".

Figure 7:
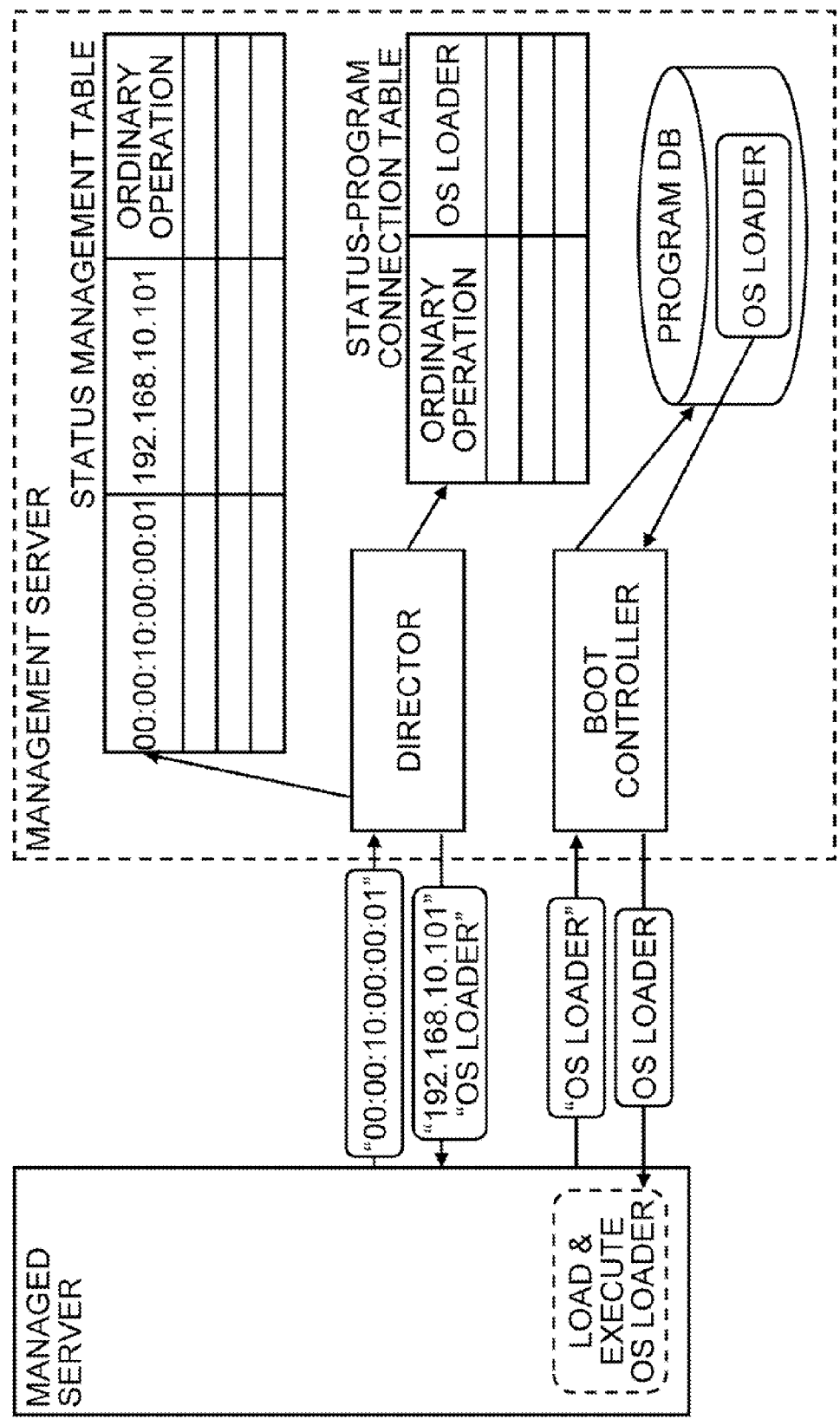
FIG. 7 is a diagram illustrating an exemplary process, for a specific case, carried out by a managed server and a management server according to an embodiment of the present invention.

In a second specific example, such a case will be discussed that the operation status of the managed server 1 is put into an ordinarily operating state. FIG. 7 illustrates a process carried out by the managed server 1 and the management server 2, and data transmitted and received in this specific example. In this specific example, it is supposed that a MAC address of the managed server 1 is "00:00:10:00:01:01".

The managed server 1 transmits its own MAC address "00:00:10:00:01:01" to the management server 2 as the server ID. At this time, the director 31 assigns an IP address "192.168.10.101" to the managed server 1 and sets the IP address to one of entries registered on the status management table 41, which corresponds to the MAC address "00:00:10:00:01:01". Since the operation status of the entry corresponding to the MAC address "00:00:10:00:01:01" on the status management table 41 is "ordinary operation", the director 31 determines an operation status "ordinary operation" as the operation status that the managed server 1 is shifted into through a network boot. Then, the director 31 determines the OS loader specified in an entry corresponding to the operation status "ordinary operation" from entries on the status-program connection table 42 as a program that the managed server 1 loads. The director 31 notifies the managed server 1 of pieces of information indicating the assigned IP address and the determined program. The OS loader is a program to load the managed server 1 with an OS and to make the server start to ordinarily work. The OS may be stored either in the storage device of the managed server 1 or in a storage device of an external server including the management server 2 and excluding the managed server 1.

The managed server 1 accesses the boot controller 32 of the management server 2 to load the OS loader. The boot controller 32 of the management server 2 provides the managed server 1 with the OS loader stored in the program database 43. Upon receiving the program, the managed server 1 loads and executes the OS loader. As a result, the managed server 1 loads the OS and is shifted into an ordinarily operating state.

Figure 8:
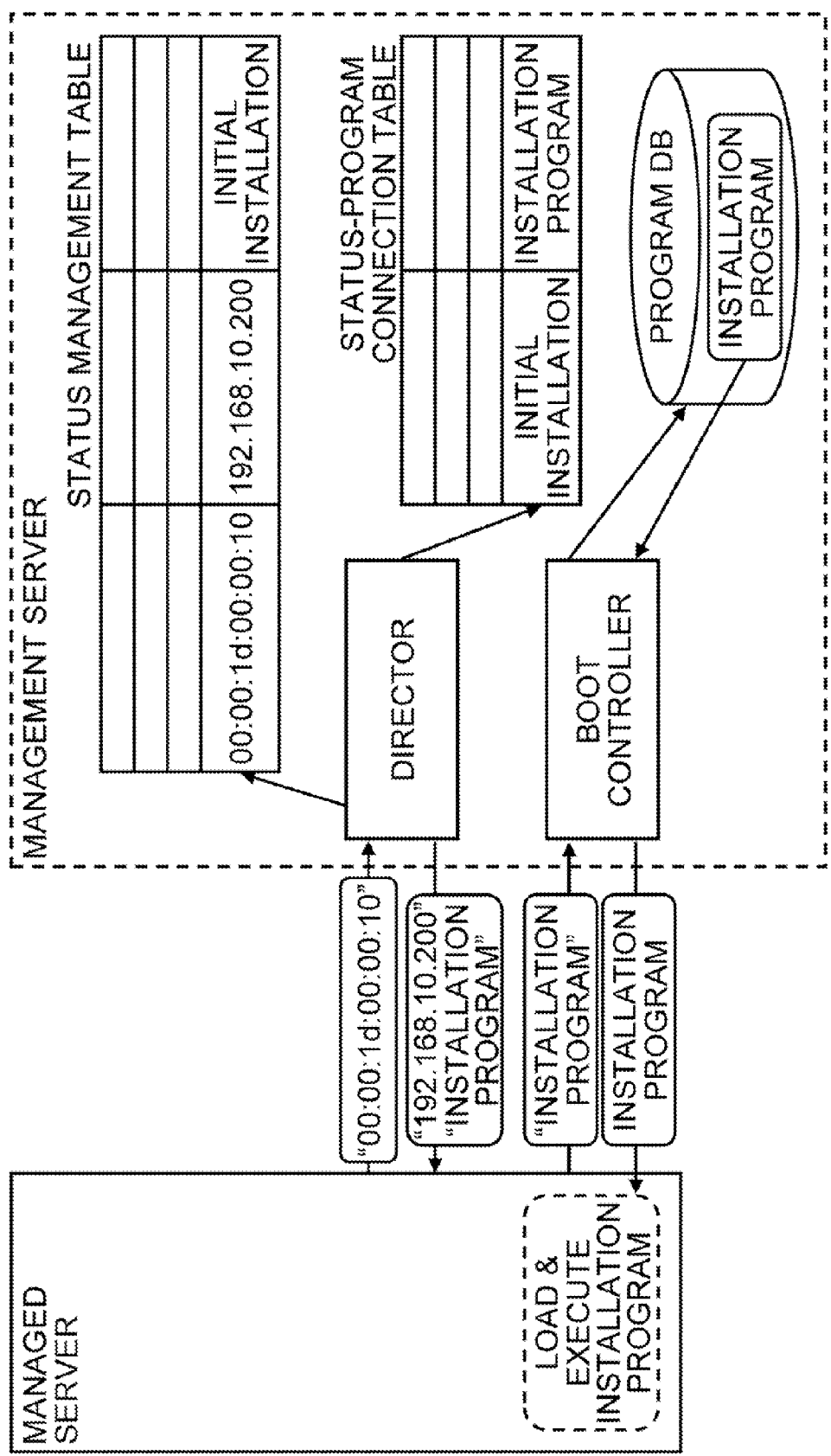
FIG. 8 is a diagram illustrating an exemplary process, for a specific case, carried out by a managed server and a management server according to an embodiment of the present invention.

In a third specific example, such a case will be discussed that a new managed server 1 is connected to the network and installed. FIG. 8 illustrates a process carried out by the managed server 1 and the management server 2, and data transmitted and received in this specific example. In this specific example, it is supposed that a MAC address of the managed server 1 is "00:00:1d:00:00:10".

The managed server 1 transmits its own MAC address "00:00:1d:00:00:10" to the management server 2 as the server ID. At this time, the director 31 assigns an IP address "192.168.10.200" to the managed server 1, registers a new entry corresponding to the MAC address "00:00:1d:00:00:10" on the status management table 41, and sets the IP address to the new entry. The director 31 determines the operation status of the managed server 1 as an initial status such as "initial installation". Then, the director 31 determines the installation program specified in an entry corresponding to the operation status "initial installation", from entries on the status-program connection table 42 as a program that the managed server 1 loads. The director 31 transmits pieces of boot information indicating the assigned IP address and the determined program to the managed server 1. The installation program is a program to implement a process necessary when a server is installed, i.e., to load a managed server 1 not being equipped yet with an OS or various kinds of initial setup files with the OS, etc. from an external server, etc.

The managed server 1 notifies the boot controller 32 of the management server 2 of its own IP address and accesses the boot controller 32 to load the installation program. The boot controller 32 of the management server 2 provides the managed server 1 with the installation program stored in the program database 43. Upon receiving the program, the managed server 1 loads and executes the installation program during a network boot. As a result, an OS is installed from another server such as a maintenance server, etc. into the managed server 1, and a process necessary for initial installation of the managed server 1 is carried out.

Second Embodiment

In a server management system according to a second embodiment, an operation status set on the status management table 41 may be changed in accordance with a notification (request) coming from the managed server 1. Differences between the first and second embodiments only will be discussed below.

Figure 9:
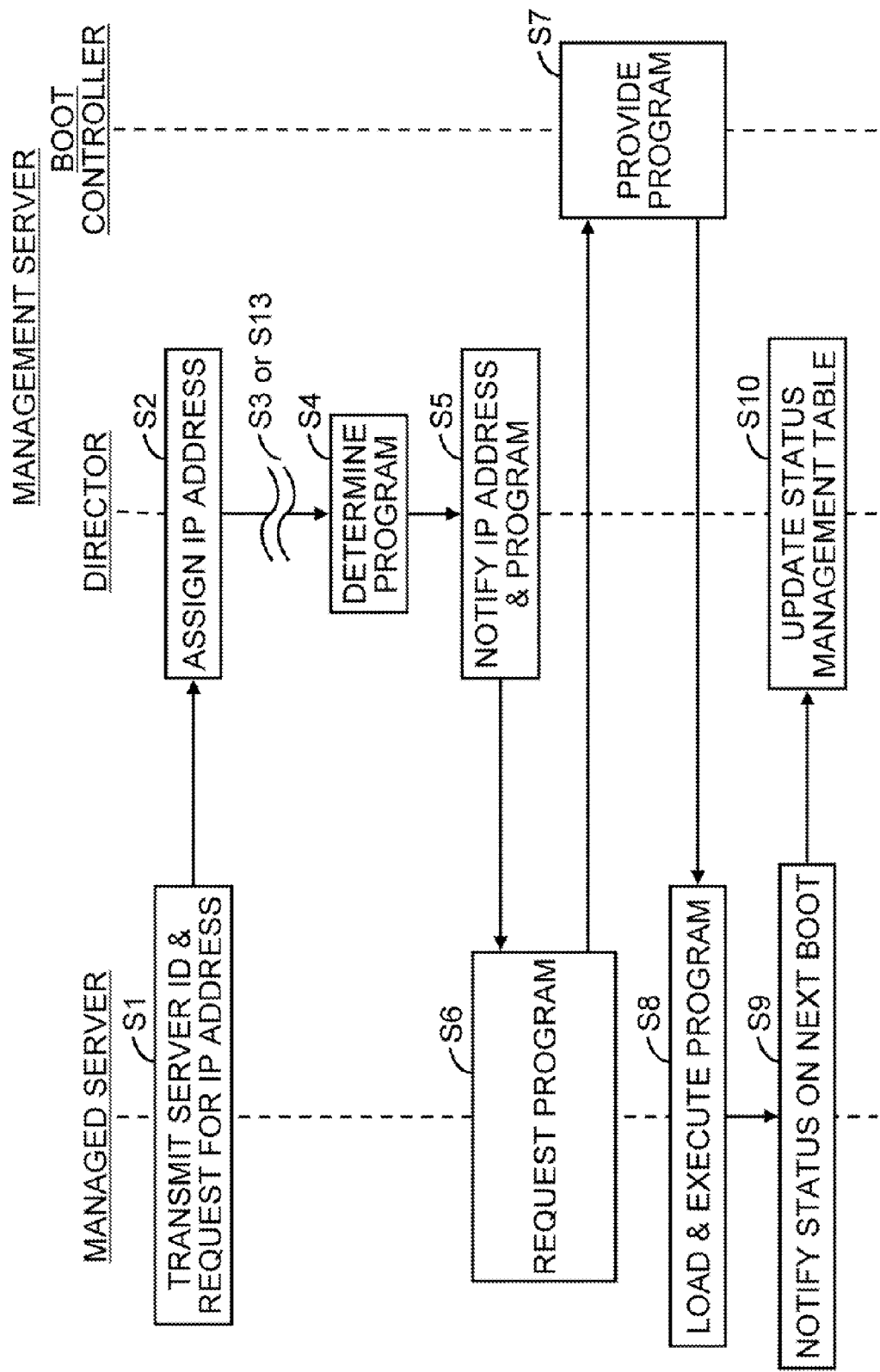
FIG. 9 is a diagram illustrating an exemplary time sequence of a process carried out by a managed server and a management server according to an embodiment of the present invention.

FIG. 9 illustrates an exemplary time sequence of a process carried out by the managed server 1 and the management server 2 when the managed server 1 starts a network boot. In the process, an operation status specified on the status management table 41 is changed in accordance with a notification coming from the managed server 1.

Since S1 to S8 and S13 are the same as those in the time sequences illustrated in FIG. 5 or 6, discussion thereof will be omitted.

In S9, the managed server 1 notifies the management server 2 of an operation status that the managed server 1 should be shifted into through a network boot next time.

In S10, the director 31 of the management server 2 changes the setup of the operation status on the status management table 41 on the basis of the operation status specified in the notification received from the managed server 1.

Figure 10:
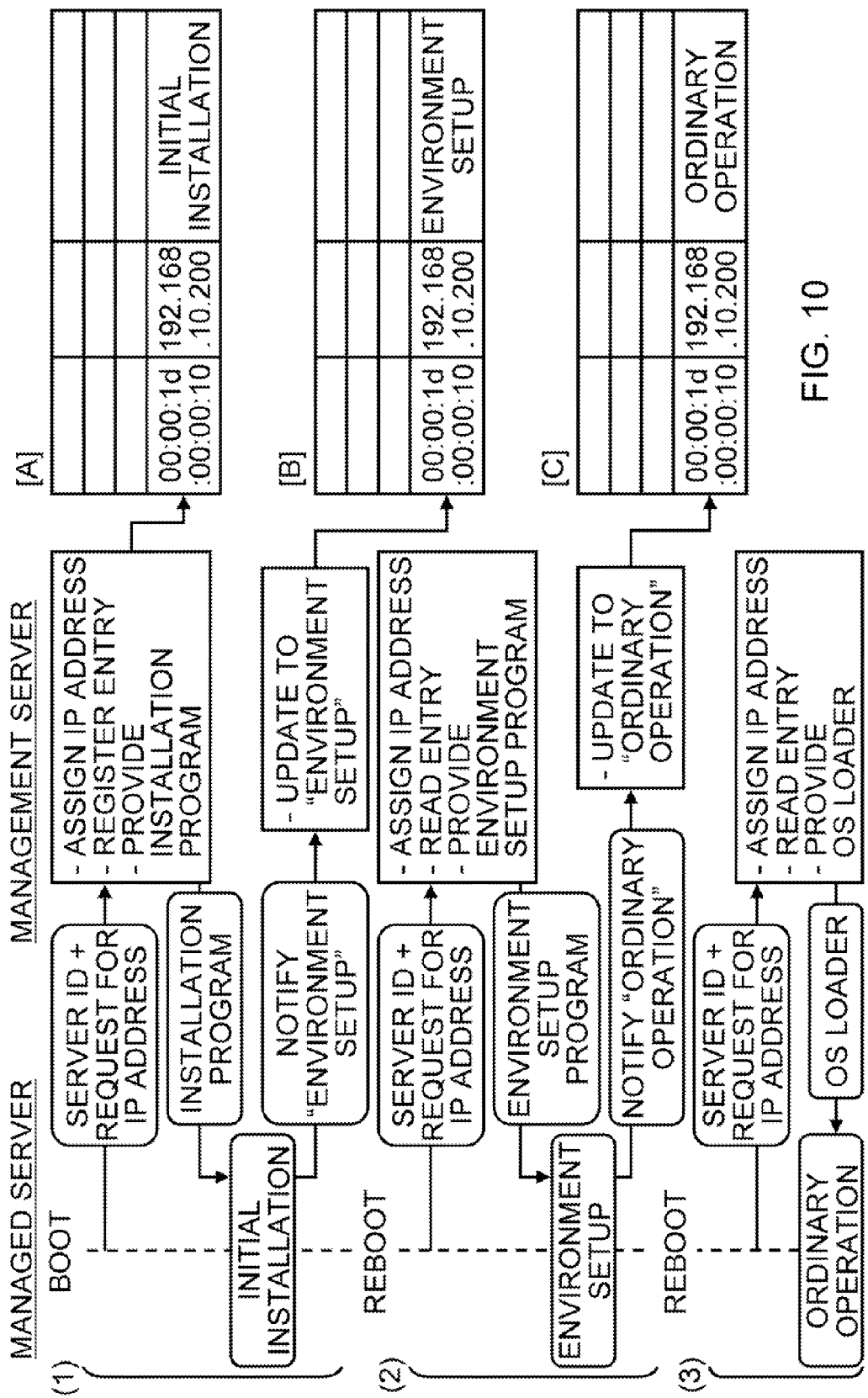
FIG. 10 is a diagram illustrating a specific example of a state transition of a managed server according to an embodiment of the present invention.

The process of the second embodiment carried out by the managed server 1 and the management server 2 will be discussed here by using a specific example such that the operation status is automatically shifted in series when the managed server 1 is installed. FIG. 10 illustrates a state transition of the managed server 1, data transmitted and received, a transition of contents of entries of the management server 2, etc. in this specific example. It is supposed that contents of the status management table 41 and contents of the status-program connection table 42 of the management server 2 in this specific example are as illustrated in FIG. 2 and in FIG. 3 when the process starts, respectively. Further, it is supposed that at least an installation program, an environment setup program and an OS loader are stored in the program database 43. Still further, it is supposed that a MAC address of the managed server 1 of this specific example is "00:00:1d:00:00:10".

(1) When a new managed server 1 is connected to the network and the new managed server 1 starts a network boot, the managed server 1 transmits a request for assigning an IP address as well as its own MAC address "00:00:1d:00:00:10" to the management server 2. The director 31 of the management server 2 assigns an IP address "192.168.10.200", registers a new entry corresponding to the MAC address "00:00:1d:00:00:10" of the managed server 1 on the status management table 41, and sets the assigned IP address. At this time, the director 31 regards the operation status of the managed server 1 as initial installation, and determines the "installation program" as the program that the managed server 1 loads. A table [A] in FIG. 10 indicates contents of a related entry on the status management table 41 at this phase. Then, the managed server 1 loads the installation program via the boot controller 32 and executes the installation program during the network boot. As a result, the managed server 1 is put into an "initial installation" state, and installs an OS, etc.

After completing the installation process, then, the managed server 1 notifies the management server 2 that the managed server 1 will be shifted into an operation status of an environment setup through a network boot next time. Upon receiving this notification, the director 31 of the management server 2 updates an operation status of the entry on the status management table 41, corresponding to that managed server 1 into an "environment setup" state. A table [B] in FIG. 10 indicates contents of the related entry on the status management table 41 at this phase.

(2) The managed server 1 reboots itself. At this time, the managed server 1 transmits a request for assigning an IP address as well as its own MAC address "00:00:1d:00:00:10" to the management server 2, similarly as discussed above in (1). The director 31 of the management server 2 assigns an IP address "192.168.10.200" afresh (the IP address is not necessarily the same as in (1) above), and sets the assigned IP address into the entry corresponding to the managed server 1 as well. The director 31 refers to the status-program connection table 42 and determines, on the basis of the "environment setup" state set to the operation status of the managed server 1, the "environment setup program" corresponding to the "environment setup" state as the program that the managed server 1 loads. Then, the managed server 1 loads the environment setup program via the boot controller 32 and executes the environment setup program during the network boot. As a result, the managed server 1 is put into the "environment setup" state, and carries out an environment setup process, etc.

After completing the environment setup process, then, the managed server 1 notifies the management server 2 that the managed server 1 will be shifted into an operation status of ordinarily operating through a network boot next time. Upon receiving this notification, the director 31 of the management server 2 updates an operation status of the entry on the status management table 41, corresponding to that managed server 1 into an "ordinary operation" state. A table [C] in FIG. 10 indicates contents of the related entry on the status management table 41 at this phase.

(3) The managed server 1 reboots itself again. At this time, the managed server 1 transmits a request for assigning an IP address as well as its own MAC address "00:00:1d:00:00:10" to the management server 2, similarly as discussed above in (1) and (2). The director 31 of the management server 2 assigns an IP address "192.168.10.200" afresh (the IP address is not necessarily the same as in (1) or (2) above), and sets the assigned IP address into the entry corresponding to the managed server 1 as well. The director 31 refers to the status-program connection table 42 and determines, on the basis of the "ordinary operation" state set to the operation status of the managed server 1, the OS loader corresponding to the "ordinary operation" state as the program that the managed server 1 loads. Then, the managed server 1 loads the OS loader via the boot controller 32 and executes the OS loader during the network boot. As a result, the managed server 1 is shifted into the ordinarily operating state.

According to such a process, while the managed server 1 notifies the management server 2 of an operation status that the managed server 1 should be shifted into next time, the management server 2 may update the operation status of the status management table 41 in accordance with the notification. Thus, when a new managed server 1 is installed as discussed above, e.g., and needs to reboot again and again so as to be shifted to a next operation status, the managed server 1 may notify the management server 2 of the next operation status and reboot to carry out a network boot after the operation status is updated on the status management table 41, so that the operation status of the managed server 1 may be automatically changed over even if an administrator does not change the setup of the operation status of the management server 2 every time.

Upon updating the operation status on the status management table 41 in accordance with the notification from the managed server 1 in the above process, the management server 2 may notify the managed server 1 that the update is completed. The managed server 1 may reboot provided that the notification is received. As the setup of the operation status will have been thereby certainly changed on the status management table 41 at a next network boot, the operation status of the managed server 1 may be shifted more certainly.

In order to change the setup of the operation status, stored in the status management table 41, of each of the managed servers 1, various methods may be employed besides the method discussed above as the second embodiment. For example, a system administrator may update data on the status management table 41 either directly or by using a management tool, etc.

As still another method, e.g., when a monitoring module, etc. for monitoring the operation of the managed server 1 senses something wrong in the managed server 1, the operation status set on the status management table 41 may be changed in accordance with what is sensed. Such a monitoring module may work either on the management server 2, e.g., or on another server which is communicable with the management server 2 and the managed server 1.

The functional and physical configurations of the management server discussed above are not limited to what is illustrated above, and may be implemented through combination of respective functions and physical resources, e.g., or through further breakup in reverse. The director 31 and the boot controller 32, e.g., need not be included in one and the same server, and may be included in separate servers. The status management table 41, the status-program connection table 42 and the program database 43 need not be included in one and the same server, either. The pieces of information set on the status management table 41 and the status-program connection table 42 need not be in a tabular form, and may be maintained in a simple text form, e.g., as long as the above pieces of information are connected with each other. When the operation status of the managed server 1 is remote maintenance, a function to carry out maintenance of the managed server 1 may be implemented further by the above management server 2. The functions of the management server 2 may be implemented by a central processing unit (CPU) of a computer which executes a server management program or by a logical circuit or a field programmable gate array (FPGA).

Figure 11:
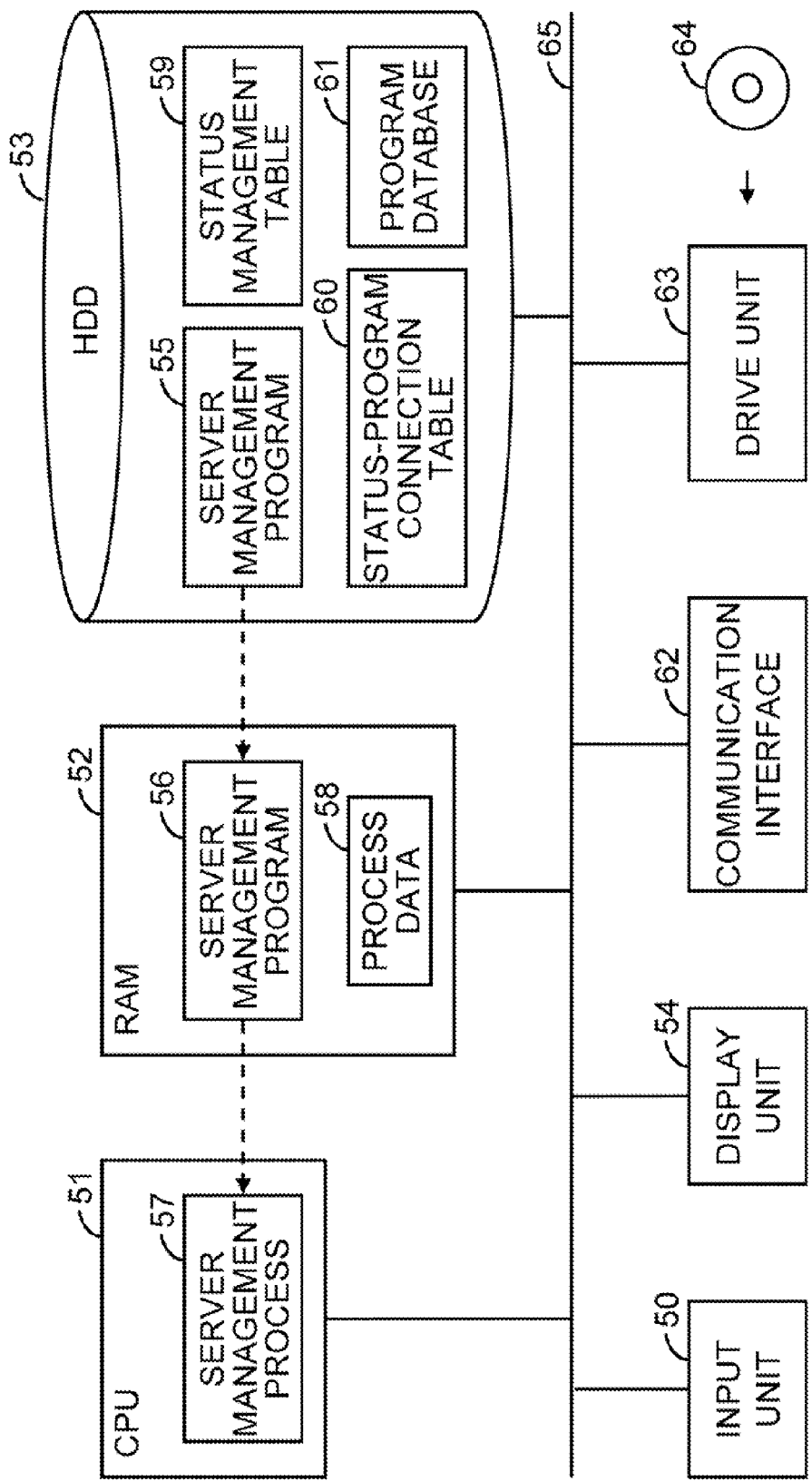
FIG. 11 is a diagram illustrating an exemplary hardware configuration of a management server according to an embodiment of the present invention.

FIG. 11 illustrates an exemplary hardware configuration of the management server 2. The management server 2 includes an input unit 50, a CPU 51, a random access memory (RAM) 52, a hard disk drive (HDD) 53, a display unit 54, a communication interface 62, a drive unit 63. These components are connected with each other via bus 65.

The input unit 50 is a device which accepts various inputs, and is, e.g., a keyboard, a mouse, a touch panel, a microphone, etc.

The CPU 51 loads the RAM 52 with a server management program 55 stored in the HDD 53, and executes the loaded server management program 56. At this time, the CPU 51 processes a server management process 57. A function (process) implemented by the server management process 57 corresponds to the process carried out by the director 31 and the boot controller 32 in the controller 3 of the management server 2 discussed above.

The RAM 52 is loaded with the server management program 55 stored in the HDD 53 by the CPU 51, and stores process data 58 required by the CPU 51 so that the CPU 51 executes the server management program 56.

The HDD 53 stores the server management program 55 therein as well as a status management table 59, a status-program connection table 60 and a program database 61. The status management table 59, the status-program connection table 60 and the program database 61 correspond to the status management table 41, the status-program connection table 42 and the program database 43 illustrated in FIG. 1, respectively.

The display unit 54 displays various kinds of output data, and is, e.g., a display device, etc.

The communication interface 62 establishes a connection to a network, etc.

The drive unit 63 reads data from and/or writes data to a computer-readable media 64.

The server management program 55 need not be stored in the HDD 53, and may be stored, e.g., in various kinds of computer-readable media 64 such as a compact disc (CD), a digital versatile disc (DVD), a flash memory, etc. Further, the server management program 55 may be stored, e.g., in various kinds of storage media provided in another server connected to the above computer through a network. Similarly, the status management table 59, the status-program connection table 60 and the program database 61 may be stored in various kinds of storage media provided in the system, or in various kinds of storage media provided in another server connected to the above computer through a network.

The server management program 55 may be stored in the computer-readable media 64 when delivered and installed onto the HDD 53 from the computer-readable media 64. The server management program 55 may be delivered over the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A computer-readable, non-transitory medium storing a program that causes a computer to execute a server management method, the computer being communicable with a managed server having a network boot function, the server management method comprising:
referring, when the managed server starts network boot, to data stored in a storage unit, the storage unit storing status management data and status-program connection data, the status management data specifying an operation status matching system conditions into which the managed server is to be shifted when the managed server has been network booted, the status-program connection data indicating a program for shifting the managed server into the specified operation status;
determining, on the basis of the status management data and the status-program connection data, a program to be executed during the network boot to shift the managed server into the specified operation status;
notifying the managed server of information necessary for loading the determined program; and
notifying a maintenance server of network information necessary for remote maintenance, the network information being included in the information notified to the managed server, the maintenance server being other than the computer.

2. The computer-readable, non-transitory medium according to claim 1, the server management method further comprising:
replacing, upon receiving from the managed server a notification of a new operation status into which the managed server is to be shifted through next network boot, the status management data stored in the storage unit with new status management data specifying the new operation status.

3. The computer-readable, non-transitory medium according to claim 1, the server management method further comprising:
detecting an abnormality in the managed server; and
replacing, upon detecting an abnormality in the managed server, the status management data stored in the storage unit with new status management data specifying a new operation status corresponding to the abnormality.

4. The computer-readable, non-transitory medium according to claim 1, the server management method further comprising:
storing new status management data in the storage unit in absence of status management data relating to a new managed server in the storage unit, the new status management data specifying a predetermined operation status into which the new managed server is to be shifted.

5. The computer-readable, non-transitory medium according to claim 1, wherein the status management data including a server identifier together with status data indicating the specified operation status, the server identifier being for identifying the managed server, the server management method further comprising:

receiving, when the managed server starts the network boot, a server identifier from the managed server; and obtaining the status data included together with the received server identifier in the status management data.

6. A server management apparatus communicable with a managed server having a network boot function, the server management apparatus comprising:

a storage unit for storing status management data and status-program connection data, the status management data specifying an operation status matching system conditions into which the managed server is to be shifted when the managed server has been network booted, the status-program connection data indicating a program for shifting the managed server into the specified operation status; and a processor to refer, when the managed server starts network boot, to data stored in the storage unit, to determine, on the basis of the status management data and the status-program connection data, a program to be executed during the network boot to shift the managed server into the specified operation status, to notify the managed server of information necessary for loading the determined program, and to notify a maintenance server of network information necessary for remote maintenance, the network information being included in the information notified to the managed server, the maintenance server being other than the managed server.

7. A server management method executed by a management server communicable with a managed server having a network boot function, the server management method comprising:

referring, when the managed server starts network boot, to data stored in a storage unit, the storage unit storing status management data and status-program connection data, the status management data specifying an operation status matching system conditions into which the managed server is to be shifted when the managed server has been network booted, the status-program connection data indicating a program for shifting the managed server into the specified operation status;

determining, on the basis of the status management data and the status-program connection data, a program to be executed during the network boot to shift the managed server into the specified operation status, by the management server;

notifying the managed server of information necessary for loading the determined program; and notifying a maintenance server of network information necessary for remote maintenance, the network information being included in the information notified to the managed server, the maintenance server being other than the management server.

8. A server management system comprising:

a managed server having a network boot function, the managed server being configured to transmit a request for assigning an Internet protocol (IP) address upon starting network boot, receive assigned IP address and status-program connection data indicating a program for shifting the managed server into an operation status into which the managed server is to be shifted when the managed server has been network booted, and load and execute the indicated program on the basis of the received status-program connection data; and a management server communicable with the managed server, the management server including a storage unit for storing status management data and the status-program connection data, the status management data specifying an operation status matching system conditions into which the managed server is to be shifted when the managed server has been network booted, the management server being configured to assign an IP address to the managed server upon receiving the request, refer to data stored in the storage unit, determine, on the basis of the status management data and the status-program connection data, a program to be executed during the network boot to shift the managed server into the specified operation status, notify the managed server of the assigned IP address and the status-program connection data, and notify a maintenance server of network information necessary for remote maintenance, the network information being included in the information notified to the managed server, the maintenance server being other than the managed server.

* * * * *